(12) United States Patent
Turner et al.

(10) Patent No.: US 6,627,220 B2
(45) Date of Patent: Sep. 30, 2003

(54) TABLETS CONTAINING HEAT SENSITIVE MATERIALS AND METHOD FOR FORMING THEREOF

(75) Inventors: Stephen J. Turner, Covington, WA (US); Steven K. Kazemi, Arvada, CO (US); Tanya M. Borek, North Bend, WA (US); Jeffrey S. White, Longmont, CO (US)

(73) Assignee: Scolr, Inc., Redmond, WA (US)

( * ) Notice: Subject to any disclaimer, the term of this patent is extended or adjusted under 35 U.S.C. 154(b) by 0 days.

(21) Appl. No.: 09/904,807

(22) Filed: Jul. 13, 2001

(65) Prior Publication Data

US 2003/0085484 A1 May 8, 2003

(51) Int. Cl.[7] ............................. A61K 9/14; A61K 9/20
(52) U.S. Cl. ..................... 424/464; 264/348; 264/28; 425/404; 425/446; 424/465
(58) Field of Search ..................... 264/28, 237, 348; 425/404, 445, 446, 345; 424/464, 465

(56) References Cited

U.S. PATENT DOCUMENTS

| 4,099,900 | A | * | 7/1978 | Bradbury et al. | ........... 425/313 |
|---|---|---|---|---|---|
| 5,234,696 | A | * | 8/1993 | Van Scoik et al. | .......... 424/464 |
| 5,403,528 | A | * | 4/1995 | Fowler | ....................... 264/130 |
| 6,139,872 | A | * | 10/2000 | Walsh | .......... 424/464 |
| 6,280,780 | B1 | * | 8/2001 | Degady et al. | ............. 426/512 |

* cited by examiner

Primary Examiner—Robert Davis
Assistant Examiner—Thu Khanh T. Nguyen
(74) Attorney, Agent, or Firm—Christensen O'Connor Johnson Kindness PLLC

(57) ABSTRACT

The present invention provides a process and apparatus for preserving the potency of a tableted heat sensitive ingredient. The process includes the steps of forming the ingredient into a tablet and cooling the tablet for a sufficient time and at a sufficiently low temperature to decrease the heat degradation of the ingredient. The process may be carried out in any number of tablet cooling apparatus, including a conduit forming a passageway for receiving tablets from the tablet press. A coolant inlet is connected to the conduit for supplying coolant into the passageway and into contact with the tablets.

7 Claims, 2 Drawing Sheets

TABLETS CONTAINING HEAT SENSITIVE MATERIALS AND METHOD FOR FORMING THEREOF

FIELD OF THE INVENTION

The present invention relates to the production of consumable tablets, and more specifically to the production of consumable tablets incorporating heat sensitive ingredients.

BACKGROUND OF THE INVENTION

Many substances may be delivered to the digestive tract through the use of tablets. These tablets can include any number of ingredients including nutritional substances, pharmaceuticals, vitamins, herbs, etc. These ingredients can be incorporated into tablets through the use of a tablet press. Tablet presses take large volume amounts of these ingredients and compress them into a much denser tablet form.

The compressive forces from the tablet press can cause a significant increase in the temperature of the tablet ingredients. Many of the tablet ingredients are temperature sensitive. Thus the increase in temperature due to tablet compression may result in decreased potency of the tablet ingredients.

To achieve an end product tablet with desired potency, current tablet processes will use large excesses of beginning material. The necessity of including this excess material, to overcome the losses due to temperature sensitivity, increases the cost of production due to the amount of substance used to make the tablet, and due to the increased volume of material that the processing equipment must handle.

Refrigeration and freeze drying are known for the protection of food products (such as meat) from contaminant.es and to keep the food fresh. However, this type of processing is done to prevent the normal degradation that food goes through at ambient temperature. This type of processing does not address the issue of the decrease in potency of tablet ingredients due to processing conditions.

SUMMARY OF THE INVENTION

The present invention provides a process and apparatus that enable preserving the potency of a tableted heat sensitive ingredient. The process includes the steps of forming the ingredient into a tablet and cooling the tablet for a sufficient time and at a sufficiently low temperature to decrease the heat degradation of the ingredient. The process may be carried out in any number of tablet cooling apparatus that provide for cooling of the heat sensitive ingredient.

In one embodiment, the invention provides a tablet cooling apparatus for cooling tablets after the tablets have been formed in a tablet press. The tablet cooling apparatus includes a conduit, a coolant inlet and a coolant source. The conduit defines a passageway, having an inlet and an outlet. The outlet is adapted to receive tablets from the tablet press. The conduit is oriented and arranged so that the tablets will pass along the passageway from the conduit inlet to the outlet. The coolant inlet is coupled to the conduit for supplying coolant to the passageway. The coolant source supplies coolant to the coolant inlet. The coolant inlet is positioned in the conduit so that the coolant is supplied to at least a portion of the passageway so that the tablets are bathed in coolant as they travel along the conduit from the conduit inlet to the outlet.

In a further embodiment, the present invention provides a tablet cooling apparatus for cooling tablets after the tablets have been formed in a tablet press having a tablet outlet. The tablet cooling apparatus includes a container, a coolant inlet and a coolant source. The container has an outer surface, an inner surface, a bottom portion, and a top lid portion defining an at least partially enclosed space. The top lid portion is hingedly connected to the bottom portion. The bottom portion of the enclosed space is capable of containing coolant. The container is in flow communication with the tablet outlet and is capable of receiving tablets into the enclosed space, thereby placing the tablets and coolant in contact in the enclosed space. The coolant inlet is coupled to the container for supplying coolant to the enclosed space. The coolant source supplies coolant to the coolant inlet.

In another embodiment of the invention, a process is provided for preserving the potency of a heat sensitive ingredient. The process includes the steps of forming the ingredient into a tablet, and cooling the tablet for a sufficient time and at a sufficiently low temperature to decrease the heat degradation of the ingredient.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention provides a process and apparatus that enable preserving the potency of a tableted heat sensitive ingredient. The process includes the steps of forming the ingredient into a tablet and cooling the tablet for a sufficient time and at a sufficiently low temperature to decrease the heat degradation of the ingredient. The process may be carried out in any number of tablet cooling apparatus that provide for cooling of the heat sensitive ingredient.

As used herein the term tablet cooling apparatus refers to any of the various apparatus embodiments described herein, as well as any apparatus capable of carrying out the process of the present invention.

The term ingredient includes but is not limited to nutritional substances, pharmaceuticals, vitamins, herbs, or combinations thereof. For example the ingredient may include: any biologic component including any beneficial bacteria; Lactobacillus strains including *L. acidophilus, L. plantarum, B. bifidum, B. longum*; enzymes; proteins; heat sensitive herbals; heat sensitive nutritionals, vitamins and minerals; soil organisms; vector or virus delivery components; heat sensitive molecules that degrade or denature in the presence of heat; or amino acids.

As used herein the term potency means the amount or the percent of ingredient that is capable of producing a desired chemical reaction. For biologic tablet ingredients the potency may be defined as the amount or the percent of ingredient viability.

As used herein the term heat damage means the decrease in potency of an ingredient due to the increase in temperature from the tableting process and does not include any decrease in potency due to normal degradation over time.

As used herein the term "processing temperature" means the temperature of formed tablets at conventional processing conditions which is normaly from 25–35° C.

Figure 1:
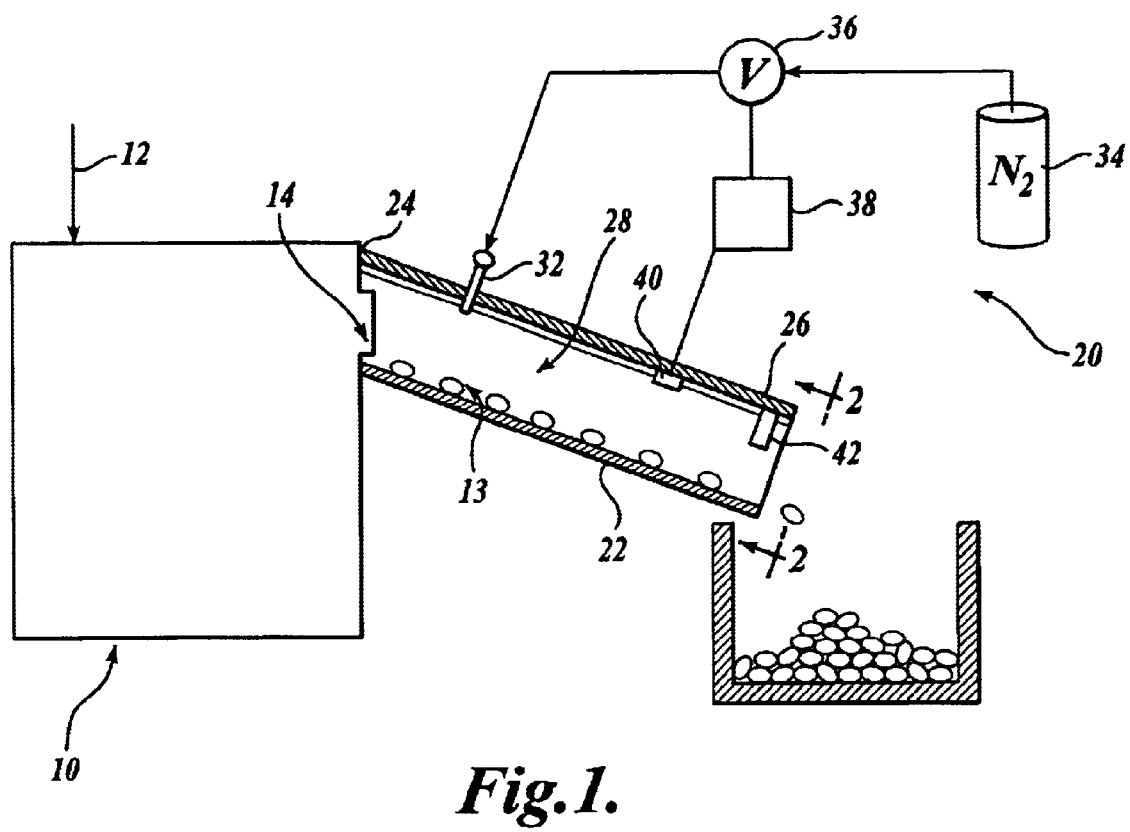
FIG. 1 shows a sectional view of a tablet press and a tablet cooling apparatus having a conduit in accordance with the present invention.

The present invention may be carried out in conjunction with a commercially available tablet press. Referring to FIG. 1, tablet ingredient feed 12 is fed into the tablet press 10, compressed into tablets 13, and tablets 13 exit the tablet press 10 from a tablet press outlet 14. The processing of the ingredients in the tablet press 10 results in an increase of heat in the tablet 13. The heat increases over time to a maximum point and then gradually decreases over time to ambient temperature. The hot tablets 13 are released from the tablet press 10 at the tablet press outlet 14. A tablet cooling apparatus 20 in accordance with the present invention places coolant in contact with the hot tablets 13. The coolant contacts the hot tablets 13 and lowers the tablets' temperature or limits the increase of the tablets' temperature that would normally occur.

The tablet cooling apparatus 20 of the present invention includes a conduit 22 connected in flow communication with the tablet press outlet 14. The conduit 22 may be connected to the tablet press 10 in any conventional way. The tablet press 10 may have a preinstalled connection device for removably securing the conduit 22 to the tablet press 10. In the present invention, the conduit 22 may be constructed so as to be removably matable with the connection device provided on tablet press 10.

The conduit 22 has an inlet 24 and outlet 26 defining a passageway 28. The conduit 22 may be oriented so that the passageway 28 slopes downwardly from inlet 24 to outlet 26. The tablets 13 are released out the tablet press outlet 14 and into inlet 24. Gravity or a mechanical device then transports the tablets 13 along passageway 28, through outlet 26 and into a receptacle 29.

The tablet cooling apparatus 20 of the present invention also includes a coolant inlet 32 and a coolant supply 34. The coolant inlet 32 may be an opening, a nozzle, or similar device for dispensing the coolant into passageway 28. The coolant inlet 32 is coupled in flow communication with the conduit 22. The coolant supply 34 delivers coolant through the coolant inlet 32 and into passageway 28. When introduced into the passageway 28, the coolant contacts and cools the tablets 13. The coolant may run in co-current flow with the tablets 13 where the conduit is oriented so that the passageway 28 slopes downwardly from inlet 24 to outlet 26.

The coolant supply 34 may be located at a remote location and piped into the coolant inlet 32. The remote location may minimize worker contact with the coolant as well as minimize the footprint of the tablet cooling apparatus 20.

In one aspect of the invention, liquid nitrogen is used as the coolant, however other coolants may be used without departing from the present invention. The coolant may be a liquid or a gas. The coolant may be non-flammable and non-toxic. It is preferred that the coolant not adversely affect the digestibility of the tablets. Additionally the tablet cooling apparatus 20, may cool the tablets 13 by use of a refrigeration apparatus, where the refrigerant does not directly contact the tablets 13.

The tablet cooling apparatus 20 may include a valve 36 in coolant flow communication between the coolant inlet 32 and the coolant source 34. The flow of coolant into the passageway 28 may be regulated by increasing or decreasing the opening of the valve 36.

The valve 36 may be operated manually. Alternatively, a control device 38 may be associated with the valve 36. The control device 38 receives an output signal from a sensor 40 connected to the tablet cooling apparatus 20. The control device 38 processes the information from the sensor 40 and responds by adjusting the opening of the valve 36, thereby regulating the flow of coolant to the passageway 28. The sensor 40 may be a temperature sensor, flow sensor, fluid level sensor, or any other sensor or combination of sensors. Where a temperature sensor 40 is employed, the temperature of the passageway 28 may be maintained by the control device 38 adjusting the flow of coolant to the passageway. The temperature sensing device 40 may be a thermocouple, thermometer, or any other temperature sensing device known in the art. It will be understood that the sensor 40 may be used in the absence of the control device 38 for monitoring and/or for use with the manual control of valve 36.

It will be understood that for any given tablet ingredient or mix of tablet ingredients a different cooling temperature may result in the optimum viability or optimum cost savings. An optimum cooling temperature may be found by using the techniques described below in the examples. The optimum temperature may be anywhere from the processing temperature to absolute zero for a particular tablet ingredient. For those tablet ingredients tested herein, the temperature for cooling the tablets to decrease the heat damage to the tablet ingredient may be maintained from the processing temperature to −250° F. The temperature may also be maintained from −50° F. to −250° F., from −100° F. to −250° F., or from −200° F. to −250° F.

The tablet cooling apparatus 20 of the present invention may include a fan 42 connected to the conduit 22 along passageway 28; where the fan 42 stimulates the flow of coolant through the passageway 28.

The tablet cooling apparatus 20 may additionally be insulated. The insulation may serve to increase the efficiency of the tablet cooling apparatus 20 and/or to reduce the risk of worker contact with low temperature surfaces.

Figure 2:
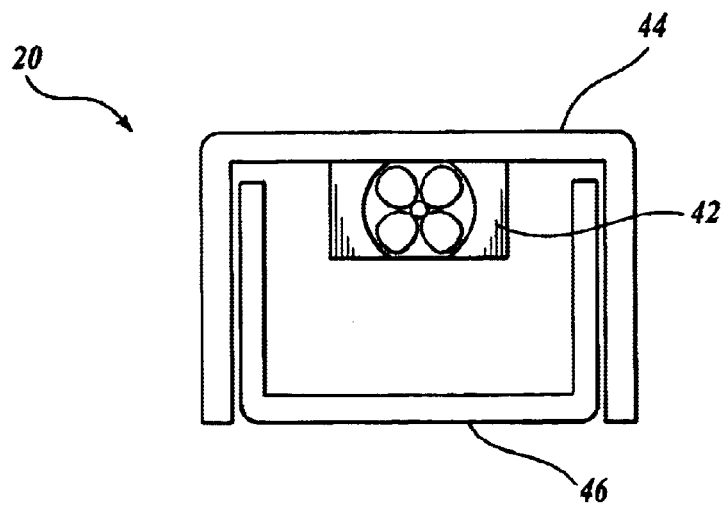
FIG. 2 shows an end view of a conduit in accordance with the present invention.

Referring to FIG. 2, in one embodiment, the invention provides a conduit 22 having a chute cover 44 connected to an open top tablet chute 46 defining the passageway 28. The chute cover 44 may be connected to the tablet chute 46 in any conventional way. The chute cover 44 shown has an inverted rectangular "U" shape joined intimately with rectangular "U" shaped tablet chute 46, defining a rectangular passageway 28. It will be understood that the conduit 22, passageway 28, chute cover 44, and tablet chute 46 may be of any shape, including but not limited to rectangular, circular, or elliptical. It is also not essential that the tablet chute 46 and chute cover 44 be correspondingly shaped. However, corresponding shape may be advantageous for fitting the tablet chute 46 and chute cover 44 together.

Figure 3:
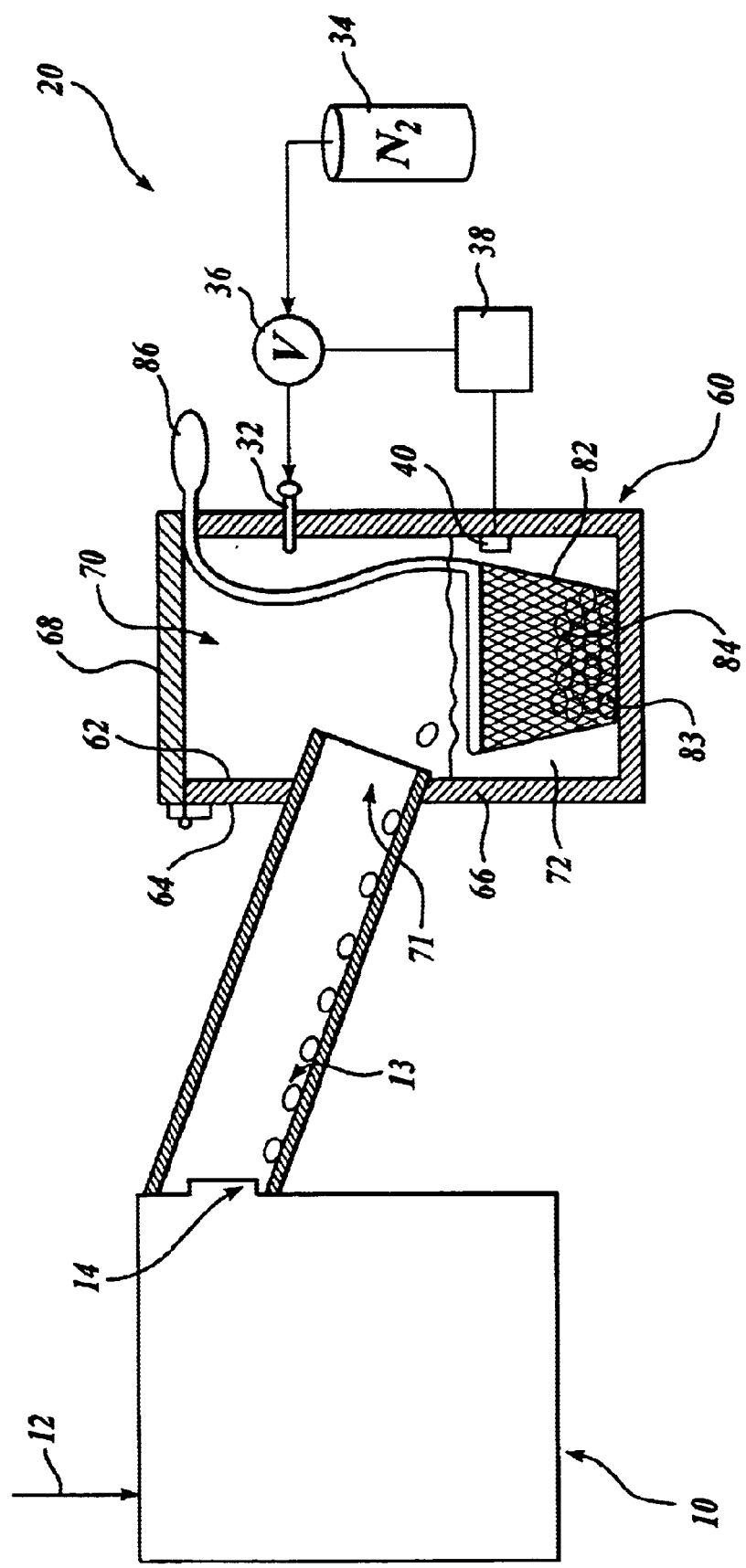
FIG. 3 shows a sectional view of a tablet press and a tablet cooling apparatus having a container in accordance with the present invention.

Referring to FIG. 3, in another embodiment of the present invention, the tablet cooling apparatus 20 includes a container 60 for use with the tablet press 10. The container 60 includes an inner surface 62, an outer surface 64, a bottom portion 66, and a top lid portion 68. The top lid portion 68 may be hingedly connected to the bottom portion 66. The top portion 68 and bottom portion 66 define an at least partially enclosed space 70.

The container 60 is in flow communication with the tablet press outlet 14 and is capable of receiving tablets 13 into the bottom portion 66. The container 60 may further include a tablet inlet 71. The tablet inlet 71 passes through the container outer surface 64 to the inner surface 62. The tablet inlet 71 is in flow communication with the tablet press outlet 14 and is capable of receiving tablets 13.

The enclosed space 70 is capable of containing coolant 72. The coolant 72 may be supplied to the container 60 in any manner. The container 60 may be coupled in flow communication with a coolant inlet 32 and a coolant supply 34. The coolant supply 34 delivers coolant 72 through the coolant inlet 32 and into the enclosed space 70. When introduced into the enclosed space 70, the coolant 72 contacts and cools the tablets 13. The coolant 72 may collect in the bottom portion 66, forming a coolant bath that the tablets 13 may drop into.

The tablet cooling apparatus 20 may further include a hopper 82 for removing tablets from the container 60 and separating coolant 72 from the cooled tablets 13. The hopper 82 has a bottom surface 83 for retaining tablets and at least one aperture 84 for releasing coolant 72 when the hopper 82 is removed from container 60. The hopper 82 may further include a handle 86 for manually lifting the hopper 82 in and out of the container 60. Alternatively, the removal of the hopper 82 may be automated. The handle 86 may extend above the coolant 72 level and may also extend beyond the enclosed space 70.

EXAMPLES

Two examples are set forth below. Example I explores the possible detrimental effects of cooling tablet ingredients in liquid nitrogen for extended periods of time. Example II explores the use of a tablet cooling apparatus, having a conduit including a chute cover connected to an open top tablet chute and a liquid nitrogen coolant source, used in conjunction with a tablet press to produce tablets with improved potency.

Example I

Pre-formed caplets of an FOS blend, an acidophilus blend, and an acidophilus product were acquired. The ingredient make-up of these commercial source caplets is listed below in Table 1.

TABLE 1

Commercial Source Caplet Ingredients

FOS blend contains - *L. acidophilus, L. bulgaris, S. thermophilus*
Acidophilus blend contains - *L. acidophilus, L. bulgaris, B. bifidum, S. thermophilus*
Acidophilus product contains - *L. acidophilus*

Ten to fifteen test caplets were taken from each commercial source. Specimen caplets from each commercial source were retained as a control. The remaining test caplets were then placed in metal carriers and submerged in liquid nitrogen. At chosen time intervals, one caplet from each incubated sample was removed from the liquid nitrogen for testing.

Each control sample and each cooled sample were then plated. The caplets were crushed, diluted, and spread onto testing plates. All brands were spread onto commercially available growth media. All brands were spread onto MRS plates.

Additionally, the acidophilus blend sample was spread onto RCM plates to provide satisfactory growth media for the *B. bifidum* component.

The MRS plates were then incubated at 37° C. in a $CO_2$ incubator. The RCM plates were placed in an anaerobe jar and incubated at 37° C. All of the plates were incubated for at least 48 hours.

A total lactic count for each sample was then taken. The results of the control group are shown below in Table 2. The results of the cooled group are shown below in Table 3.

As can be seen in Table 3, the large percentage of total lactic count retained in the cooled samples compared to the control samples indicates that cooling in liquid nitrogen has limited detrimental effect, if any, on the ingredients tested here.

TABLE 2

Control Group
Original Counts of Caplets Before Freezing

| Commercial Caplet | lactic count per caplet |
|---|---|
| FOS blend: | $8.5 \times 10^8$/caplet |
| Acidophilus blend: | $5.6 \times 10^7$/caplet |
| Acidophilus product: | $4.2 \times 10^8$/caplet |

TABLE 3

Cooled Only Group
Counts for Caplets After Freezing in Liquid $N_2$ (All Counts Per Caplet), as well as Percent Log and Percent of Cooled Count Per Control Count

| | Time Left in $N_2$ | 15 min. | 30 min. | 60 min. | 120 min. |
|---|---|---|---|---|---|
| FOS | lactic count per caplet | $7.4 \times 10^8$ | $7.6 \times 10^8$ | $4.5 \times 10^8$ | $3.7 \times 10^8$ |
| | (% log) | 99.3% | 99.5% | 96.9% | 95.9% |
| | (%) | 87% | 89.4% | 52.9% | 43.5% |
| Acidophilus blend | lactic count per caplet | $4.8 \times 10^7$ | $6.6 \times 10^7$ | $2.4 \times 10^7$ | $4.6 \times 10^7$ |
| | (% log) | 99.1% | 100.9% | 95.2% | 98.8% |
| | (%) | 85.7% | 117.8% | 42.8% | 82.1% |
| Acidophilus product | lactic count per caplet | $5.7 \times 10^7$ | $7.6 \times 10^7$ | $2.8 \times 10^7$ | $4.1 \times 10^7$ |
| | (% log) | 101.7% | 103.3% | 97.6% | 99.8% |
| | (%) | 135.7% | 180.9% | 66.6% | 97.6% |

Ten to fifteen additional caplets were then taken from each commercial source. The additional test caplets were then placed in petri dishes. The petri dishes with the caplets were then placed in an oven at about 120° F. for 10 to 15 minutes, and were then removed. This heating simulated the heat generated during the tablet process. The heated caplets were then placed in metal carriers and submerged in liquid nitrogen. At chosen time intervals, one caplet from each incubated sample was removed from the liquid nitrogen for testing.

Each of the heated and cooled samples were then plated. A total lactic count for each sample was then taken. The results of the heated and cooled group are shown below in Table 4.

As can be seen in Table 4, the large percentage of total lactic count retained in the heated then cooled samples compared to the control samples indicates that cooling in liquid nitrogen has limited detrimental effect if any on the ingredients tested here.

TABLE 4

Heated and Cooled Group
Counts for Caplets Heated to 120° F., Then Frozen in Liquid $N_2$ (All Counts Per Caplet), as well as Percent and Percent Log of Heated and Cooled Count Per Control Count

|  | Time Left in $N_2$ | 15 min. | 30 min. | 60 min. | 120 min. |
|---|---|---|---|---|---|
| FOS | lactic count per caplet | $3.2 \times 10^8$ | $4.4 \times 10^8$ | $4.6 \times 10^8$ | $3.7 \times 10^8$ |
|  | (% log) | 95.2% | 96.7% | 97% | 95.9% |
|  | (%) | 37.6% | 51.7% | 54.1% | 43.5% |
| Acidophilus blend | lactic count per caplet | $8.1 \times 10^7$ | $6.3 \times 10^7$ | $5.0 \times 10^7$ | $7.4 \times 10^7$ |
|  | (% log) | 102% | 100.6% | 99.3% | 101.5% |
|  | (%) | 144.6% | 112.5% | 89.2% | 132.1% |
| Acidophilus product | lactic count per caplet | $5.9 \times 10^7$ | $3.6 \times 10^7$ | $3.2 \times 10^7$ | $4.3 \times 10^7$ |
|  | (% log) | 101.9% | 99.1% | 98.4% | 100.1% |
|  | (%) | 140.4% | 85.7% | 76.1% | 102.3% |

Example II

The application of cooling the tablet ingredients was then further explored at the commercial production level. Tablet ingredients L. acidophilus, B. bifidum, L. bulgaricus, and S. thermophilus were formed into tablets using a standard tablet press modified as described above to have an open top tablet chute covered with a chute cover to form an enclosed passageway. The chute cover was supplied with a coolant inlet and liquid nitrogen coolant source. A manual control valve was placed in the supply line from the coolant source to the coolant inlet. A thermometer was placed through the chute cover to provide temperature readings. Four runs were tested: two control runs with no cooling, a run where the temperature of the enclosed passageway was maintained from –100° F. to –150° F., and a run where the temperature of the enclosed passageway was maintained from –200° F. to –250° F. The resultant tablets were then tested for total lactic count. The results can be seen below in Table 5.

As can be seen in Table 5, there is a large increase in the amount of ingredient that remains potent. At a minimum, comparing the first control result to the results of the –200° F. to –250° F. run, there is a $4.0 \times 10^7$/caplet increase in the count of lactic acid. This results in an increase of 25% in potency for the –200° F. to –250° F. run. Comparing the second control result to the –100° F. to –150° F. test group, there is a $2.15 \times 10^8$/caplet increase in the count of lactic acid. This results in an increase of 1433% in potency for the –100° F. to –150° F. run. Either of these are a significant increase in the potency of the tablets produced and can result in less feed material having to be used to achieve the same potency in the end product.

TABLE 5

Commercial Product Test

| Test | Total Lactic Count |
|---|---|
| Control Test 1 Original (not cooled) | $1.6 \times 10^8$/caplet |
| Control Test Original (not cooled) (Retest) | $1.5 \times 10^7$/caplet |
| Test 1 (–100° to –150° F.) | $2.3 \times 10^8$/caplet |
| Test 1 (–200° to –250° F.) | $2.0 \times 10^8$/caplet |

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A process of preserving the potency of a heat sensitive ingredient comprising the steps of:
   forming the ingredient into a tablet; and
   cooling the tablet for a sufficient time at a low temperature from processing temperature to –250° F. to decrease the heat degradation of the ingredient.

2. The process of claim 1, wherein the temperature is maintained from –50° F. to –250° F.

3. The process of claim 1, wherein the temperature is maintained from –100° F. to –250° F.

4. The process of claim 1, wherein the temperature is maintained from –200° F. to –250° F.

5. A tableted heat sensitive ingredient produced according to the process of claim 1.

6. A process of preserving the potency of a heat sensitive ingredient comprising the steps of:
   forming the ingredient into a tablet; and
   cooling the tablet for a sufficient time and at a sufficiently low temperature to decrease the heat degradation of the ingredient and improve the potency of the tablet from 25% to 1433% greater than a tablet formed without cooling.

7. A tableted heat sensitive ingredient processed according to the process of claim 6.

* * * * *